Oct. 23, 1962  J. N. FEHLINGER  3,059,854
HEATING CONTROL SYSTEM
Filed Nov. 23, 1959  3 Sheets-Sheet 1

FIG. I.

INVENTOR.
JOHN N. FEHLINGER
BY
ATTORNEYS

Oct. 23, 1962  J. N. FEHLINGER  3,059,854
HEATING CONTROL SYSTEM
Filed Nov. 23, 1959  3 Sheets-Sheet 2

INVENTOR.
JOHN N. FEHLINGER
BY
Morgan, Finnegan, Durham & Pine
ATTORNEYS

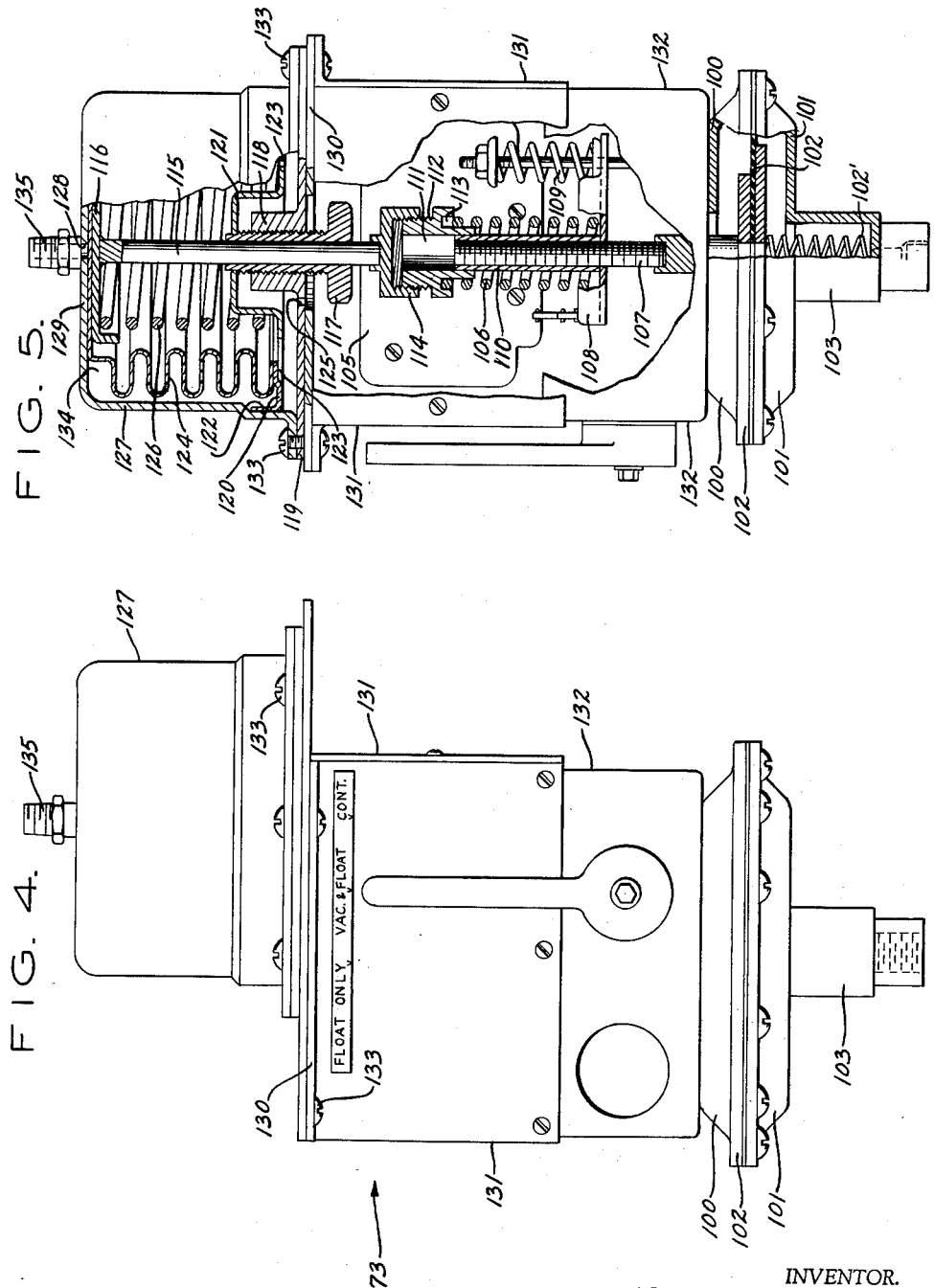

United States Patent Office 3,059,854
Patented Oct. 23, 1962

3,059,854
HEATING CONTROL SYSTEM
John N. Fehlinger, Mountain Lakes, N.J.
(5 Beekman St., New York 38, N.Y.)
Filed Nov. 23, 1959, Ser. No. 854,821
10 Claims. (Cl. 236—91)

This invention relates to space heating systems and relates more particularly to steam space heating systems for large buildings.

Conventional heating systems for large buildings are computed and installed based on the outside temperature to be expected during the heating season. For example, in the New York city area the systems are designed for comfort heating with an outside temperature of 0° F. Inasmuch as this temperature extreme is seldom reached, it becomes apparent, that, in general, these systems are too large for average operating conditions. It is for this reason that systems have been devised with an adjustable on/off arrangement for supplying steam intermittently so that over-heating does not occur. With such intermittent operation steam is wasted in reheating lines and radiator surfaces more oversized than conditions generally require.

It is accordingly an object of this invention to enable economies to be effected in the heating of buildings with steam by minimizing this wastage of steam and, at the same time, to enable even heating to be effected through the provision of a new and improved control system for space heating systems which control system is intended for essentially continuous operation, except for extremely mild days, using steam supplied at lower pressure, even in the sub-atmospheric (vapor) range, on the supply side, so that the desired more even heating may be achieved with lower density, lower temperature steam.

Another object of this invention is to enable heating of large buildings with steam to be effected not only more evenly but also with a fully heated radiation in all parts of the building, thereby to augment and improve the effectiveness of existing "zone" control arrangements since there will be little or no "off" time, or dead spots, and, hence, no lag.

Another object of this invention is to enable the differential between the pressure of the steam entering the building steam heating system and the pressure in the vacuum returns, to be adjusted to, and maintained constant at, the minimum pressure differential at which, for the system requirements, full circulation of steam in the system at a minimum cost, will be ensured, and to accomplish this through the provision of a control system which will automatically control both the steam entering the system and the vacuum in the returns.

Other and further objects of this invention will appear from the following description, the accompanying drawings and the appended claims.

In general, and to the accomplishment of the foregoing objects, the control system employs an indoor temperature-measuring and signal-transmitting unit and a corresponding outdoor unit. The heating system to be controlled includes the usual supply- and outlet-valve units for controlling the flow of the heat transfer medium in the distribution system. Individual control-pilot units responsive to a control signal, are provided for simultaneously controlling the settings of the supply- and outlet-units, respectively. Individual temperature-measuring and signal-transmitting units are provided for continuously separately measuring the indoor and outdoor temperatures, respectively. These units serve to continuously individually transmit a temperature signal which is of a magnitude proportional to the temperature of the temperature-sensing member of the unit.

The indoor temperature signal is applied to a master control signal supply unit which, in turn, serves to supply to the individual pilot-control units an independent master control signal of a magnitude which is a selected percentage of the indoor temperature signal.

This master control signal, acting through the individual control pilot units, serves to increase, or decrease, the settings of the supply- and outlet-valve units so as to increase, or decrease, the supply of heating fluid to the distribution system commensurately with the heating requirements and yet maintain a constant, but adjustable, pressure differential between the inlet and outlet sides of the distribution system.

The master control signal supply unit to which the indoor temperature signal is applied, has provision for automatically varying the magnitude of the master control signal which it emits, in response to changes in the magnitude of the indoor temperature. It also has means for neutralizing, that is, counterbalancing, the indoor temperature signal at whatever indoor temperature is selected as a "set point." To this end therefore the neutralizing means of the master control signal unit is settable to any of a number of temperature set points corresponding to a number of selected indoor temperatures, so as to exercise its signal neutralizing function at whatever indoor temperature is selected for the set point.

The outdoor temperature signal is applied to a signal-supply rate-action relay unit which, in turn, serves to supply to the neutralizing means of the master control signal supply unit, a supplementary control signal which serves to vary the set point of the neutralizing means automatically in response to changes in the outdoor temperature.

The rate-action relay unit for supplying this supplementary signal is of the impulse totalizing type and has provision in the form of rate-adjustment valve means, for varying the magnitude of the supplementary control signal at will. In general, this valve means will be set compatible with the inertia of the heating system of the building. If the outdoor temperature decreases at a higher rate than the setting of this rate adjustment, indicating that the rate of change is greater than the heating system inertia, then, steam, for example, fed to the building as well as the vacuum of the return will be automatically increased accordingly so that more steam will be sent into the system in anticipation of temperature drop, thus preventing the temperature inside the building from falling. This is in effect an anticipatory or preacting function. Hence, the master control signal supply unit will send out a master control signal to both the control-pilot unit controlling the steam supply pressure control valve and to the adjustable vacuum switch controlling the vacuum pump, which will effect both an adjustment to the setting of steam supply valve and the setting of the vacuum switch so that, regardless of whether the steam supply is increased or decreased, the pressure drop across the system as a whole will be maintained constant.

According to a further feature of this invention, the master control signal supply unit has provision for both proportional band adjustment and reset rate adjustment, which will be set to the requirements of the building and the system.

In the accompanying drawings which form part of the instant specification and in which like numbers refer to like parts throughout the several views:

FIG. 4 is a view in side elevation of the presently preferred embodiment of the adjustment vacuum switch employed for controlling the vacuum pump in the control system of FIG. 1;

FIG. 5 is a cut-away view in front elevation and with parts in section of the adjustable vacuum switch of FIG. 4, the view showing mechanism for applying the master control signal to adjustment of the cut-out point of the switch;

Figure 1:
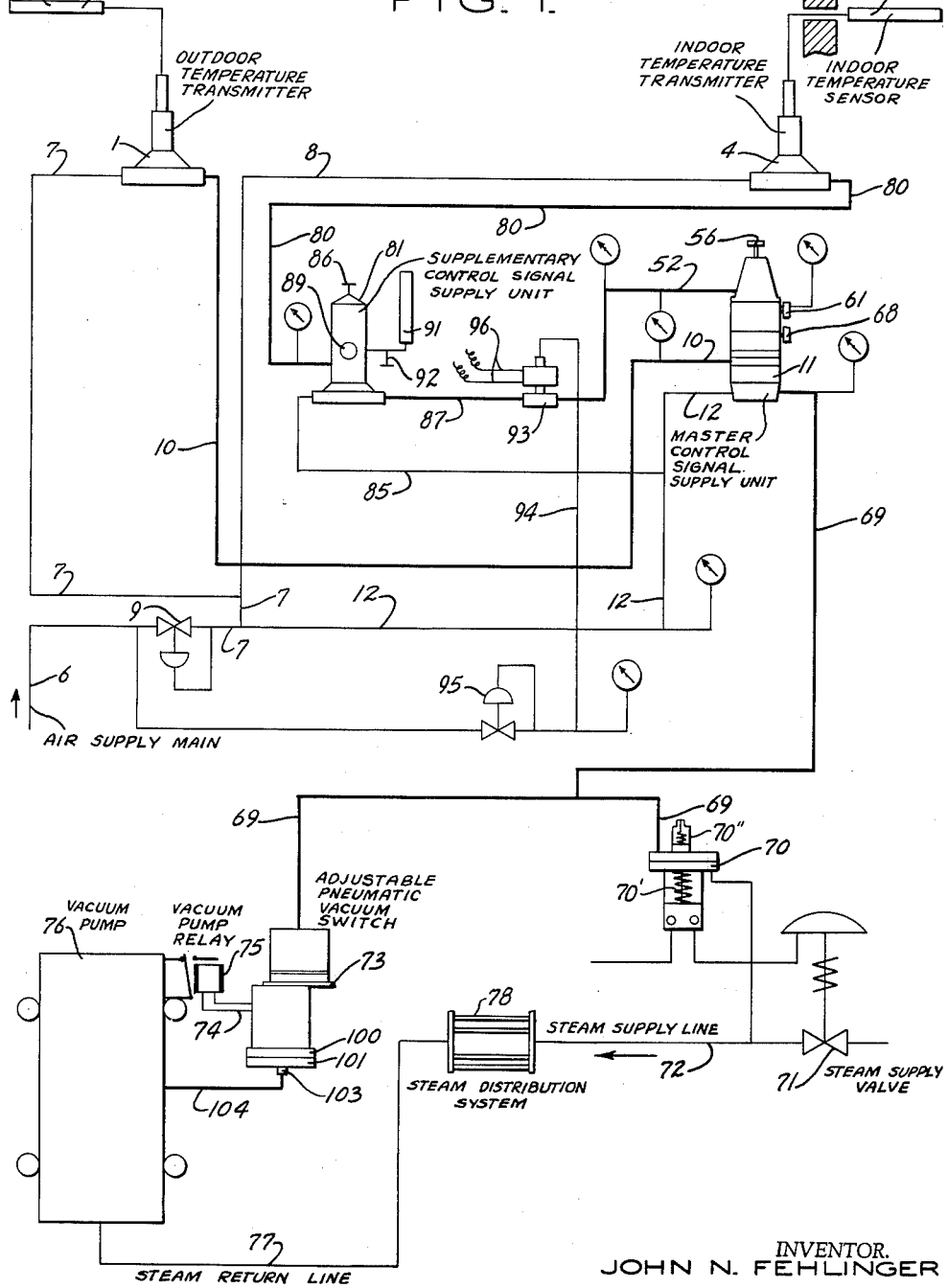
FIG. 1 is a schematic view of a presently preferred embodiment of the control system of this invention as applied to a steam distribution system with vacuum return.

Referring now more particularly to the accompanying drawings, a temperature-measuring and air-signal transmitting unit 1 having a temperature-sensing member 2 has the member 2 suitably located within the interior of a building indicated by the wall fragment 3, so as to measure the temperature of the indoor space to be heated. There is provided also a separate temperature-measuring and air-signal transmitting unit 4 having a temperature-sensing bulb 5 suitably located at the exterior of the building. Advantageously, the units 1 and 4 may each correspond to the temperature transmitter unit Model 33B1020 as manufactured by Moore Products, Co., Philadelphia, Pa., and as depicted in Moore Products Co. Bulletin 3302.

The units 1 and 2 are each supplied with air under pressure obtained from an air-supply main 6 and fed to the units through the air-supply branch lines 7 and 8, respectively. A pressure-regulating valve 9 in the main 6 maintains the air in the branch lines at a suitable constant working pressure, preferably 15 pounds per square inch gauge (p.s.i.g.).

The indoor unit 1 serves to transmit as an output air signal through an air-signal line 10, a part of this input air signal which part is commensurate with the temperature at the temperature-sensing bulb 2. The unit 1 is so calibrated that if, for example, its range is 60° F. to 80° F., at 60° F. the transmitted pressure and, hence, the air output signal in line 10, would be 5 p.s.i.g.; and, at 80° F., is 15 p.s.i.g. The normal output signal at 70° F. would then be 10 p.s.i.g. The unit is, preferably, extremely sensitive, measuring and transmitting a change of, preferably, as little as .01% of the temperature scale. Its signal (air output) per degree change at the bulb 2 is, preferably, completely linear. It is located, preferably, not above the sixth floor. Above this level there may be too great a "stack" effect (natural drafts) which would subject the sensing bulb 2 to excessive air movement and accordingly cause a false transmitted air pressure, that is, output air signal through the line 10. The output air signal is fed by the line 10 into a master control signal supply unit 11.

The master unit 11 is an instrument that is sensitive to the output air signal supplied to it from the indoor temperature signal transmitter unit 1. Like the latter it is supplied with a separate operating air supply fed to the unit from the air supply main 6, through a branch air supply line 12. The air is supplied at a pressure of, preferably, 15 p.s.i.g. Advantageously, the unit 11 may correspond, with one important difference, to the controller, Model 55 as manufactured by Moore Products Co., Philadelphia, Pa., and depicted in Moore Products Co. Bulletin No. 502. The unit is depicted semi-schematically in FIG. 2 wherein the operating air from the separate air supply is supplied to a booster pilot valve chamber 13 in the bottom section of the instrument. This chamber is in connection through a header passage 14 and individual branch passages 15, 16 and 17, having metering restrictions 18, 19 and 20, respectively, with individual air chambers 21, 22 and 23, respectively.

The chamber 21 is adapted to vent through a normally closed vent nozzle 24 into a bleed chamber 25, which, in turn, vents through a branch passage 26 into a header passage 27. The latter communicates at its lower end with a booster chamber 28. Operating air from the separate air supply is adapted to be supplied to the booster chamber 28 from the chamber 13 through a normally closed bleed nozzle 29. The nozzle 29 is closed by a spring-pressed ball valve 30 having a stem 31 whose upper end seats in a bleed nozzle 32 formed in a spring-pressed movable diaphragm 33 forming one wall of the booster chamber 28.

The diaphragm 33 forms with a flexible diaphragm 34, a bleed chamber 35 which is vented to the atmosphere through a vent passage 36. A coil spring 37 balances the weight of the diaphragm 33 and its nozzle 32 in the equilibrium closed position of the parts as shown.

Figure 2:
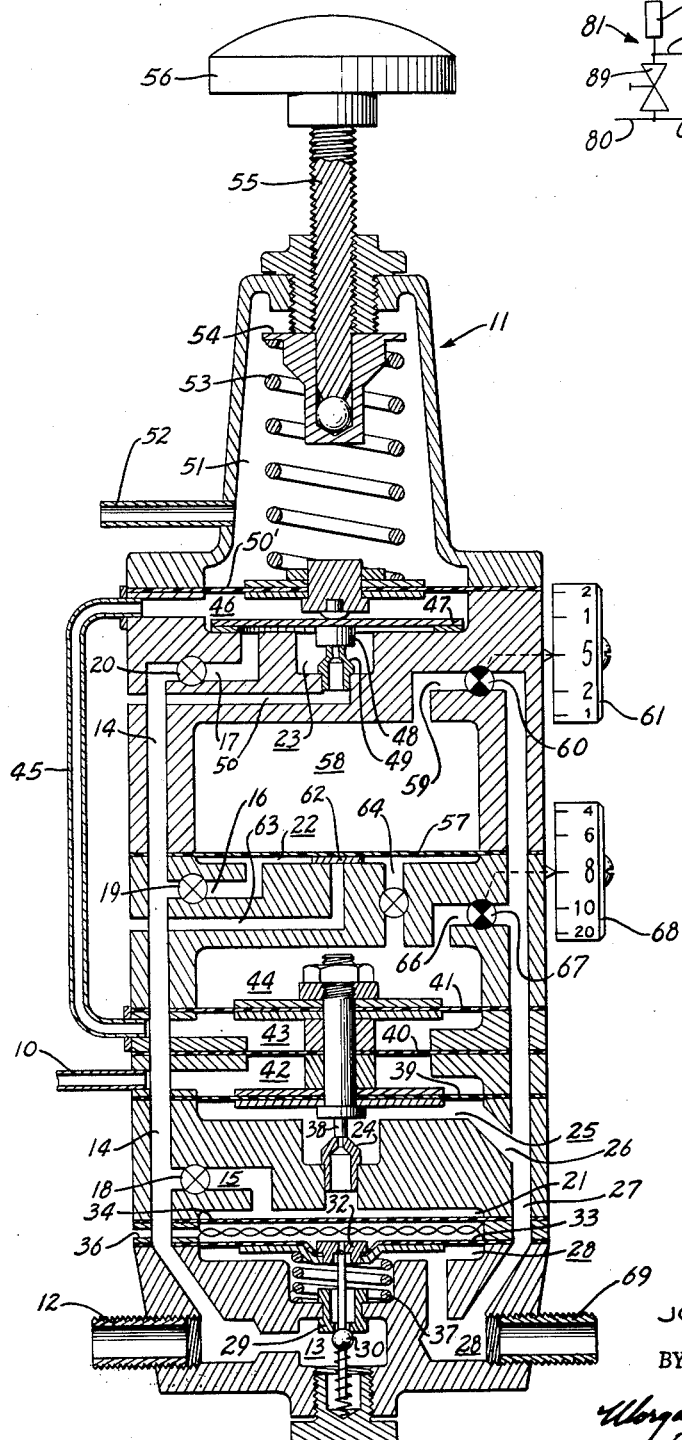
FIG. 2 is a semi-scematic view in section of a master control signal supply unit employed in the control system of FIG. 1, the view being taken along the vertical medial plane of the unit.

The vent nozzle 24 is normally closed as shown in FIG. 2, by a diaphragm actuated valve 38 carried by diaphragms 39, 40 and 41. These form in the unit and with each other pressure chamber 25 above-mentioned, and individual pressure chambers 42, 43 and 44.

The pressure chamber 42 is fed with the indoor temperature signal supplied via the signal line 10, and it will be noted that the diaphragm 40 is common to the chambers 42 and 43. The chamber 43 is connected by a suitable conduit 45 with a pressure chamber 46 so that the fluid pressure in chamber 43 is the same as that in chamber 46. Thus, the pressure exerted by the indoor temperature input signal in the chamber 42 may be neutralized by or balanced against the pressure in the chamber 43 and, a priori, against that in the upper chamber 46.

The operating air supplied through the line 12, header passage 14 and branch passage 17 to the chamber 23 acts against a disc valve 47 having a central valve member 48 seated on a vent nozzle 49 normally closed thereby. The vent nozzle 49 serves to vent both the chamber 23 and the chamber 46 to the atmosphere through a vent passage 50 when the pressure exerted by the operating air under the disc valve 47 increases sufficiently to lift the entire disc value so that the central valve member 48 lifts off the vent nozzle 49 and the outer edge of the disc valve lifts to place the chambers 23 and 46 in communication with each other. Thus, the fluid pressure in the chambers 46 and 43 cannot exceed the established operating air pressure.

A spring-pressed loading diaphragm 50' separates the chamber 46 from a supplementary air signal chamber 51 to which a supplementary air signal is adapted to be supplied through an air signal input line 52 as will be more fully explained hereinafter. A coil spring 53 in the chamber 51 statically loads the diaphragm 50' to a degree which can be set to coerrspond to a selected "set point" temperature of the indoor temperature unit 1. To this end, a flanged fitting 54 engages the coil spring 53 and is adapted to be moved axially to compress the spring, by a loading screw 55 having the set point control knob 56.

The loading diaphragm 50' is provided with a central boss 57 which bears upon the disc valve 47 centrally thereof to hold the central valve member 48 seated on the bleed nozzle 48 against the lifting pressure exerted on the disc valve 47 by the opearting air supplied to the chamber 23. It will be observed that by reason of the supplementary air signal input line 52, the fluid pressure in the supplementary air signal chamber 51 can be increased by the supplementary air signal so as to increase the loading on the loading diaphragm 50' and thus, in effect, increase the set point of the controller 11 commensurately with the magnitude of the supplemental air signal.

The controller 11 is also partitioned internally by a valving diaphragm 57 into the chamber 22 and a reset-rate adjustment chamber 58 from which latter a bleed passage 59 leads to the output signal header passage 27. A needle valve 60 in the passage 59 is cotrolled by a suitable calibrated reset rate adjustment knob 61 whose function will be described more fully hereinafter. The valving diaphragm 57 is provided with a centrally located valve disc 62 which closes the inlet end of a vent passage 63 through which operating air supplied to the chamber may be vented to the atmosphere in regulated amounts. The pressure in the chamber 22 is balanced against the pressure established in the chamber 58 by the setting of the needle valve 60 so that an increase in the opearting air pressure will lift the valve disc 62 from its seat and permit venting of the chamber 22 to the atmosphere until equilibrium is reestablished.

The reset-rate adjustment chamber 22 is also connected by a passage 64 with the chamber 44 which latter constitutes a proportional band adjustment chamber, the passage 64 being provided with a metering restriction 65. The chamber 44 is, in turn, connected by a branch passage 66 with the output signal header passage 27. A needle valve 67 in the passage 66 is controlled by a suitably calibrated proportional band adjustment knob 68 whose function will be described more fully hereinafter.

The controller 11 functions to deliver from the output signal chamber 28 into an output signal line 69 an independent master control signal which is a selected percentage of the indoor temperature signal supplied to the controller through the signal line 10. To this end, the pressure of the operating air supplied to the controller via air supply line 12 is balanced in the chamber 46 against the combination of the pressure exerted by the spring 53 on the loading diaphragm 50' and the supplementary air pressure impressed on the diaphragm 50' by the supplementary air signal supplied to the chamber 51.

The proportional band adjustment under control of the knob 68 dictates the percent of the input signal fed by line 10 to the controller, that is delivered from the controller by line 69 to the control-pilot 70 for regulation thereby of the setting of the steam supply valve 71 in the input line 72 of the steam distribution system 78, and that is also delivered to an adjustable pneumatic vacuum switch 73 on the vacuum return side for regulating the cut-out point at which the movable contacts thereof will close. The movable contacts (not shown) are suitably electrically connected by leads 74 to a relay 75 which, on being energized by closing of the contacts, functions in known manner to start the vacuum pump 76 in the return line 77 of the steam distribution system.

The proportional band adjustment is calibrated and readily adjustable by setting of the knob 68, from 0 to 200% of the magnitude of the input signal supplied to the controller by line 10. For example, at a 9 p.s.i. loading, the controller set at 100% proportional band will send out a 9 p.s.i. signal through the control signal line 69. At a 50% setting it will send out a 12 p.s.i. signal, and at a 150% setting a 6 p.s.i. signal. As its name indicates, the proportional band adjustment controls the magnitude of the control air signal in proportion to the input signal.

The reset rate adjustment controlled by the knob 61 is calibrated in time: preferably 2 to 20 minutes per repeat. It determines the time required to return the disc valve 47 to the seated position shown in FIG. 2 upon being unseated by pressure of the operating air in chamber 23 and thus to bring the controller back to the "set point" determined by the combination of the setting of spring 53 and the supplemental air loading supplied to chamber 51 by line 52. It is apparent that without this reset device, each increment of change in the heated area as sensed by the bulb 2 and transmitted as a signal by the transmitter 1 via line 10, would cause a drop from the set point for each load condition. The magnitude of the drop would depend on the setting of the proportional band adjustment knob 68. The reset will in effect "drive" or cause the operating air pressure supplied via line 12, to vary to its extreme (e.g. 15 p.s.i. or 0 p.s.i.) if there is a deviation in the set point. The speed with which this is done will of course depend on the setting of the reset rate adjustment knob 61 which must be set to prevent "over regulation" of the system. The time required for the system to respond in the form of heat in the radiating surfaces from the time the original signal is sent calling for this correction is known as system inertia.

Figure 3:
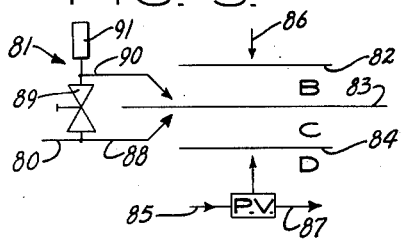
FIG. 3 is a schematic view illustrative of an impulse-totalizing rate action relay with rate adjustment needle valve means, employed in the control system of FIG. 1.

The outdoor temperature as measured by the outdoor sensing bulb 5 and delivered as a commensurate air signal by the unit 4 is transmitted therefrom through an air signal line 80 to an impulse totalizing relay schematically illustrated in FIG. 3.

The impulse totalizing or rate action relay 81 may be similar to the impulse totalizing relay, Model 68V as manufactured by Moore Products Co., Philadelphia, Pa., and illustrated in its Bulletin AD68 (Issue, December 1955) as Model No. 68V13, FIG. 25. As depicted schematically in FIG. 3 hereof, it comprises diaphragms 82, 83 and 84 forming individual pressure chambers B, C and D, and a diaphragm pilot valve, PV to which operating air at a suitable pressure, preferably 15 p.s.i., is supplied by branch line 85, which, in turn, is connected by branch line 12, FIG. 1, to the main 6 leading from the separate air supply. The diaphragm 82 is adapted to be spring-loaded, that is, biased or set by a zero screw adjustment 86 which functions in known manner to vary the transmitted pressure in line 87 over a suitable range, e.e. —18 to +18 p.s.i.g. The signal input line 80 from the temperature transmitting unit 4 feeds through an internal passage 88 in the relay to the chamber C and is connected seriatim through a needle valve 89 and a separate internal passage 90 in the relay, to the chamber B. A volume chamber 91 connects to the passage 90 but may be cut off from communication therewith by closing of a shut-off valve 92, if desired. The action of the relay is such that the transmitted pressure through line 87 varies directly in a 1:1 ratio, with a change in pressure in the chamber C, and inversely with a change in the pressure in chamber B. The relay 81 is provided with a time rate adjustment which like the reset rate adjustment of the controller 11, is calibrated, preferably, for the range 2 to 20 minutes and determines the balance of the relay. The zero screw adjustment 86 provides for the set point or biasing adjustment of the relay, as noted above.

The temperature-measuring and signal-transmitting unit 4 is, like the indoor unit 1, linear but has, preferably, a wider range than the latter as respects the range of temperatures it will measure. Preferably, this range is 0 to 60° F. Preferably, also, it is so calibrated that, for example, if its range is 0–60° F., at 0° F. it will transmit a 3 p.s.i.g. signal and, at 60° F., a 15 p.s.i.g. signal, to the impulse totalizing or rate action relay 81.

The output-signal transmitted from the relay 81 through the line 87 is preferably first fed through a solenoid valve 93 which is energized, that is, open during the day, preferably, to pass the relay output signal through into the supplementary signal feed line 52 of the controller 11 and thus into the supplementary loading chamber 51 of the controller. The solenoid valve 93 instead of being spring-loaded so as to be held open by the solenoid coil against the closing action of a spring, is, preferably, air-loaded. To this end, it may be supplied with operating air from the air supply main 6 delivered to the valve through a branch line 94 in which a pressure-reducing valve 95 serves to reduce the pressure from that in the main 6 e.g. 20–100 p.s.i.g. to a lesser working pressure of e.g. 15 p.s.i.g. The electrical leads 96 to the solenoid coil may be provided with a day/night switch (not shown) which, when open, as at night, will de-energize the solenoid coil so as to permit the air pressure in line 94 to close the solenoid valve and thus vent the output signal from the rate action relay 81 to the atmosphere and prevent its reaching the controller 11. The solenoid valve 93 may be similar to the 3-way solenoid valve, Catalog No. 25, Bulletin 8316, type A, of Automatic Switch Co. of Florham Park, New Jersey, as manufactured by that company.

Figure 7:
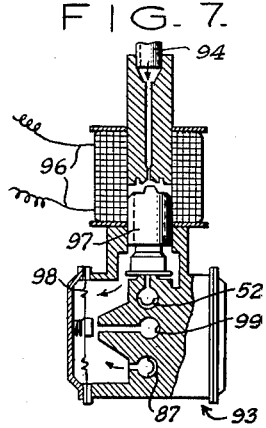
FIG. 7 is a view similar to FIG. 6, but showing the valve in its de-energized or closed position for night operation.
Figure 6:
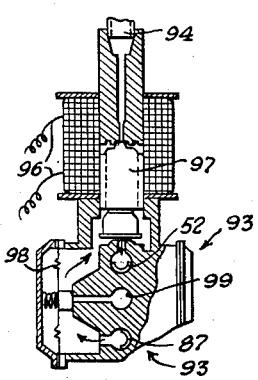
FIG. 6 is a part fragmentary, part sectional semi-schematic view of a day-night solenoid valve in the control system of FIG. 1, the view showing the valve in its energized or open position for day operation.

The valve 93 as depicted in FIG. 6 is in its open position with the solenoid coil electrically energized so that the solenoid armature or plunger 97 is raised and held in the raised position. In this raised position, the output signal supplied to the valve 93 by the rate action relay 81 through the line 87, passes interiorly of the valve, as shown by the arrows, into the supplementary signal feed line 52 of the controller 11. When the solenoid coil is de-energized by opening a switch (not shown) in the electrical supply lines 96, the air loading exerted by the operating air supplied through branch air line 94 to the top of the plunger 97, forces the plunger down to a seated position, as shown in FIG. 7. In this seated position, the output signal supplied through the line 87 can no longer pass interiorly of the valve to the controller supplementary signal feed line 52. On the contrary, the operating air supplied by branch line 94 now flows past the plunger into the valve body interior and functions to displace the normally-seated valve diaphragm 98 so as to uncover the mouth of the interior vent passage 99 leading to the exterior of the valve body and thus permit both the operating air supplied by line 94, and the output signal supplied by line 97 to vent directly to the atmosphere.

The output signal delivered by the relay 81 through line 52 to the controller 11, constitutes the supplementary loading pressure applied to the loading chamber 51, as above noted. It is additional to the pressure exerted by the spring 33 in chamber 51 at the selected set point of the controller. As noted above, the reset rate adjustment knob 61 of the controller is set to the system inertia of the building. If the outdoor temperature falls or raises at a rate commensurate with the ability of the system to maintain stability (within the inertia rate of the system) the outdoor temperature change does not affect the system. If, however, the outdoor temperature changes at a rate faster than the system can follow, the supplementary air loading to the controller provided through line 52 will change accordingly, automatically changing the set point of the controller by the bias loading or unloading of the set point adjustment. This means that the heating system will automatically readjust itself to an outdoor change before the effect of this change is felt inside. As a result, there will be little or no deviation from the set point in the location of the indoor sensing bulb 2. This preaction of the control system is one of the basic advantages of the system.

The master control signal which is transmitted from the controller 11 through the master control signal line 69 is transmitted to both the pneumatic control pilot 70 of the inlet steam diaphragm control valve 71, as well as to the pneumatic vacuum switch 73 for the control of the vacuum pump 76.

The pressure control pilot 70 is built with a spring 70' statically loading the conventional internal pressure-movable diaphragm of the pilot in one direction, the degree of compression of the spring 70' being manually adjustable so as to permit the static loading to be varied at will to compensate for changes in atmospheric pressure. Its range is preferably 30″ vacuum to 15 p.s.i.g. positive. It is provided with a second spring 70″, also statically loading the diaphragm but opposing the first, the spring compression being manually adjustable so that any desired set point can be selected within this range. It may be similar to the pressure control pilot type UA-1 as manufactured by the Leslie Co., of Lyndhurst, New Jersey, and illustrated in Leslie Bulletin No. 5303.

The diaphragm control valve 71 may be similar to the diaphragm control valve, type DDL-2 as manufactured by the above-noted Leslie Co., and as illustrated in its Bulletin No. 5304. As the temperature increases in the heated space of the building the air loading from the transmitter 1 increases; the air loading from the controller 11 increases, and this increased air loading in the form of the master control signal in the line 69 actuates the control pilot 70 which, in turn, results in the actuation of the diaphragm control valve 71 to reduce the steam or vapor entering the system. The converse is also true. The steam control valve 71 can therefore be set to system conditions and requirements independent of the control system and can be, if necessary, operated separately in emergency.

The pneumatically operated vacuum switch 78 that controls the vacuum pump 76 is in most of its aspects of conventional construction in that the diaphragm-spring casing formed by the upper and lower casing halves 100 and 101, respectively, has a diaphragm 102 clamped between the halves, and has a coil spring 102' disposed in the hollow casing extension 103. This spring preloads the diaphragm 102 in one direction in known manner. This loading is opposed by the static loading provided by a range spring 106 acting on the diaphragm in the opposite direction. The range spring 106 is manually adjustable as to its degree of compression so as to permit the static loading on the diaphragm to be varied at will both to preset the loading and to compensate for changes in atmospheric pressure. The extension 103 is connected by a vacuum line 104 to the vacuum pump 76 so as to apply the vacuum in the return 77 to the spring-loaded side of the diaphragm 102. The diaphragm is coupled by means of suitable linkage (not shown) to a conventional toggle spring linkage (not shown) which serves on an increase in vacuum from a given set point, to open a set of movable contacts disposed in a stationary contact block assembly 105, to cut-off the vacuum pump 76 through the medium of the vacuum pump relay switch 75, all in known manner. The toggle spring linkage includes the usual coil range spring 106 coaxial with the range adjustment screw 107 and supported on the spring platform 108, and the differential spring 109. The range adjustment screw is conventionally provided with a range adjustment nut (not shown) for increasing the cut-out point by increasing the loading on range spring 106, and vice versa. The contacts normally open on an increase in vacuum. This general assembly and form of vacuum pump switch corresponds in its major aspects to the type GVG-1 Vacuum Switch, Glass 9016, as manufactured by the Square D Company of Milwaukee, Wisconsin, and as disclosed in the Inst. Card L-4154, dated October 1956, of that company.

According to a feature of this invention, however, the range screw 107 is jacketed with a closely-fitting cylindrical jacket 110 carried by the spring platform 108 and enclosed by the range spring 106. The jacket is telescopically received at its upper end in the bore 111 of a tubular male coupling member 112 provided with an annular recess 113 in which the upper end of the spring is seated. The fitting is externally threaded and is coaxially threadedly received within an internally threaded female coupling member 114 so as to be secured removably thereto. An actuating rod 115 coaxial with the range screw 107 is fixedly secured at its lower end to the coupling member 114 and at its upper end to a circumferentially flanged spring-retaining washer 116. The rod 115 passes axially through the bore of an externally threaded hollow bushing 117 which is threadedly removably received in an upstanding centrally located annular boss 118 integral with a circular disc 119.

A spring-supporting circular plate 120 having an upstanding central hub 121 and an upstanding circumferential flange 122 is carried on the upper end of the bushing 117. Vent openings 123 are provided in the plate 120.

A Sylphon bellows unit coaxial with the hub 121 is bonded at its upper end to the pressure plate 116 and at its lower end to the plate 120 so as to form with the latter a closed chamber vented to the atmosphere through the vent openings 123 and supplementary vent openings 125 located around the hub 118 of the disc 119. A coil spring 126 coaxial with the rod 115 extends between the pressure plate 116 and the spring-supporting plate 116.

A cylindrical casing 127 having an opening 128 in its top wall 129 is mounted on the disc 119 which, in turn, is carried on a top wall 130 of a housing 131 which encloses and is screwed to the usual casing or housing 132 which forms part of the lower section of a conventional vacuum switch. The casing 127, hubbed disc 119 and top wall 130 are preferably separably removably fastened together and to the casing 131 as by screws 133.

The casing 127 closely fits and is sealed hermetically to the upstanding flange 122 throughout the circumferential extent of the latter so that except for the opening 128 in the top wall 129 of the casing, the annular space 134 between the casing 127 and the bellows unit 124, is airtight. A nipple 135 is secured to the casing top wall in coaxial alignment with the input opening 128 and, as shown in FIG. 1, is connected to the master control signal input line 69. Thus, air pressure applied through the nipple 135 to the space 134 within the casing 127 will compress the bellows 124 axially against the resistance offered by the bellows extension spring 126. The resultant downward movement of the pressure plate 116 will be commensurate with the magnitude of the applied pressure. This movement will be communicated through the rod 115 and couplings 113 and 114 to the range spring 106 which, in turn, will be compressed and thus loaded pneumatically in proportion to the applied master control signal. The loading on the range spring 106 may be initially set by screwing the male coupling member 112 in or out of the female coupling member 114 so as to increase or decrease, as required, the effective length of the rod 115. The static loading on the range spring is a constant value corresponding to a setting of, for example, 5″ of vacuum—but adjustable manually to increase or decrease the differential between the input and return pressures according to system demands. The air loading to the bellows 124 by the master control signal as supplied by line 69 is equal in pressure and effect to that supplied by the same line to the pressure control pilot 70 at the steam input side. Therefore, a constant pressure differential will be maintained across the system, i.e. supply to return. This differential is readily adjustable to the maximum economy of the system as a whole.

While there has been shown what is at present considered to be the preferred embodiment of this invention, it will be obvious that various changes and modifications may be made therein without departing from the scope of the invention.

What is claimed is:

1. A control system for space-heating systems having a heat transfer medium distribution system including settable supply- and outlet-control means for controlling the flow of the heat transfer medium in the distribution system, said control system comprising individual control-pilot means responsive to a control signal, for simultaneously controlling the settings of said supply- and outlet-control means, respectively; individual temperature-measuring and signal-transmitting means each having a temperature-sensing member, for continuously separately measuring indoor and outdoor temperatures, respectively, and for continuously individually transmitting a temperature signal of a magnitude proportional to the temperature of the sensing member; master control signal supply means for continuously supplying to said individual control-pilot means an independent master control signal of a magnitude which is a selected percentage of the indoor temperature signal, said master control signal supply means comprising means to which said indoor temperature signal is applied, for automatically varying the magnitude of said master control signal in response to changes in the magnitude of said indoor temperature signal, and means settable to any of a number of temperature set points corresponding to a number of selected indoor temperatures, for neutralizing said indoor temperature signal at the selected indoor temperature; and, signal-supply rate-action relay means to which said outdoor temperature signal is applied, for supplying to said neutralizing means a supplementary control signal to vary the set point of said neutralizing means in response to changes in the outdoor temperature.

2. A control system in accordance with claim 1 in which said master control signal supply means comprises means for varying the percentage magnitude of the master control signal at will.

3. A control system in accordance with claim 1 in which said signal-supply rate-action relay means comprises an impulse totalizing relay.

4. A control system for space-heating systems having a heat carrier medium distribution system and having settable supply- and outlet-control means for controlling the flow of the heat carrier medium in the distribution system, said control system comprising individual control-pilot means responsive to a control signal, for simultaneously controlling the settings of said supply- and outlet-control means, respectively; individual temperature-measuring and signal-transmitting means each having a temperature-sensing member, for continuously separately measuring indoor and outdoor temperatures, respectively and for continuously individually transmitting a temperature signal of a magnitude proportional to the temperature at the sensing member; master control means for continuously supplying to said individual control-pilot means, simultaneously, an independent master control signal of a magnitude which is a selected percentage of the magnitude of the indoor temperature signal, said master control signal supply means comprising proportional band means for varying said selected percentage at will, means to which said indoor temperature signal is applied, for automatically varying the magnitude of said independent master control signal in response to changes in the magnitude of said indoor temperature signal, means settable to any of a number of temperature set points corresponding to a number of selected indoor temperatures, for neutralizing said indoor temperature signal at the selected indoor temperature, and reset rate adjustment means for varying the reset rate of said neutralizing means at will; and, rate-action relay signal-supply means to which said outdoor temperature signal is applied, for supplying to said neutralizing means a supplementary control signal of a magnitude which is proportional to the rate of change of the outdoor temperature, to vary the set point of said neutralizing means in response to changes in the outdoor temperature, said rate-action relay signal-supply means having rate adjustment means for varying the magnitude of said supplementary control signal at will.

5. A control system for space-heating systems having a heat carrier medium distribution system and having settable supply- and outlet-control means for controlling the flow of the heat carrier medium in the distribution system, said control system comprising individual control-pilot means responsive to a fluid-pressure control signal, for simultaneously controlling the settings of said supply- and outlet-control means, respectively; individual temperature-measuring and signal-transmitting means each having a temperature-sensing member, for continuously separately measuring indoor and outdoor temperatures, respectively, and for continuously individually transmitting a fluid-pressure temperature signal of a pressure-force magnitude proportional to the temperature at the sensing member; master control means for continuously supplying to said individual control-pilot means, simultaneously, an independent fluid-pressure, master control signal of a pressure-force magnitude which is a selected percentage of the force magnitude of the indoor temperature signal, said master control signal supply means comprising proportional band means for varying said selected percentage at will, valving means to which said indoor temperature signal is applied, for automatically varying the magnitude of said independent master control signal in response to changes in the magnitude of said indoor temperature signal, force-applying means settable to any of a number of temperature set points corresponding to a number of selected indoor temperatures, for neutralizing the force exerted by said indoor temperature signal on said valving means at the selected indoor temperature, and reset rate adjustment means for varying the reset rate of said force-applying means at will; and, rate-action relay signal-supply means to which said outdoor temperature signal is applied, for supplying to said force-applying means a supplementary fluid-pressure control signal of a force magnitude which is proportional to the rate of change of the outdoor temperature, to vary the set point of said force-applying means in response to changes in the outdoor temperature, said rate-action relay signal-supply means having rate adjustment means for varying the magnitude of said supplementary control signal at will.

6. A control system in accordance with claim 5 in which said neutralizing means comprises spring-loaded diaphragm valve means.

7. A control system for steam space heating systems having a steam distribution system including a steam supply valve at the inlet side of the system and a switch-controlled vacuum pump at the return side, said control system comprising a pneumatic control-pilot for controlling the setting of said steam supply valve; a pneumatic on-off switch for starting and stopping said vacuum pump; a conduit for supplying a pneumatic master control signal to said control-pilot and said on-off switch, simultaneously; individual temperature-measuring and pneumatic signal transmitting units each having a temperature-sensing bulb and an air-supply source, for continuously separately measuring indoor and outdoor temperatures, respectively, and for continuously individually transmitting a pneumatic temperature signal of a magnitude directly proportional to the temperature at the sensing bulb; a pneumatic master controller having an independent air-supply source and to which said conduit is connected, for continuously supplying to said control-pilot and said on-off switch simultaneously an independent pneumatic master control signal of a magnitude which is a selected percentage of the magnitude of the pneumatic indoor temperature signal, said master controller comprising proportional band means for varying said selected percentage at will, diaphragm valve means to which said pneumatic indoor temperature signal is applied, for automatically varying the magnitude of said independent pneumatic master control signal in response to changes in the magnitude of said indoor temperature signal, spring-loaded diaphragm valve means including a pressure-tight chamber, settable to any of a number of temperature set points corresponding to a number of selected indoor temperatures, for supplying air under pressure to said diaphragm valve means to neutralize the pressure thereon by said indoor temperature signal at the selected indoor temperature, and reset rate adjustment means for varying the reset rate of said spring-loaded diaphragm valve means at will; and, an impulse-totalizing rate-action relay to which said pneumatic outdoor temperature signal is applied, for supplying to said pressure-tight chamber of said spring-loaded diaphragm valve means a supplementary pneumatic control signal of a magnitude proportional to the rate of change of the outdoor temperature for varying the set point of said spring-loaded valve means in response to changes in the outdoor temperature, said rate-action relay having rate adjustment means for varying the magnitude of said supplementary control signal at will.

8. In a steam distribution system including radiators, a steam supply valve on the inlet side and a vacuum pump on the outlet side, the combination of: an air signal operated pilot-control for the steam supply valve; a vacuum switch for controlling the vacuum pump, said switch having spring-loaded vacuum-actuated means for opening the switch contacts on increase in vacuum and vice versa, and having means responsive to a master air control signal for applying to said contact opening means a supplementary loading proportional to the magnitude of said master air control signal; an air signal line common to said pilot-control and said load-applying means for feeding said master control air signal to both the pilot-control and to said load applying means, simultaneously; a master controller having a separate air supply for feeding a master control air signal to said common signal line; a first temperature transmitter for feeding an indoor temperature air signal to said controller; a rate-action impulse-totalizing relay for feeding a supplementary air signal to said master controller; and, a second temperature transmitter for feeding an outdoor temperature air signal to said rate-action relay.

9. In a steam distribution system according to claim 8, said load-applying means comprising a pneumatically actuated Sylphon bellows.

10. In a steam distribution system according to claim 8, said load-applying means comprising wall means and Sylphon bellows means together forming a substantially air-tight chamber to which said master air control signal is supplied for actuating said bellows; a rigid elongated load-applying member having connection with said bellows means for movement axially in response to expansion and contraction of said bellows means, said load-applying member having connection with the loading spring of said switch means, for compressing said spring.

References Cited in the file of this patent

UNITED STATES PATENTS

| | | |
|---|---|---|
| 1,946,155 | Foster | Feb. 6, 1934 |
| 2,047,803 | Serrell | July 14, 1936 |
| 2,517,051 | Swenson | Aug. 1, 1950 |
| 2,635,618 | Moore | Apr. 21, 1953 |

FOREIGN PATENTS

| | | |
|---|---|---|
| 641,161 | France | Apr. 10, 1928 |

OTHER REFERENCES

"Automatic Control" for August 1959, pages 11–17.

UNITED STATES PATENT OFFICE
CERTIFICATE OF CORRECTION

Patent No. 3,059,854                              October 23, 1962

John N. Fehlinger

It is hereby certified that error appears in the above numbered patent requiring correction and that the said Letters Patent should read as corrected below.

In the drawing, Sheet 1, FIG. 1, the units 1 and 2 designated by the legends "OUTDOOR TEMPERATURE TRANSMITTER" and OUTDOOR TEMPERATURE SENSOR", respectively, should read -- INDOOR TEMPERATURE TRANSMITTER -- and -- INDOOR TEMPERATURE SENSOR --, respectively; same FIG. 1, the units 3 and 4 designated by the legends "INDOOR TEMPERATURE SENSOR and "INDOOR TEMPERATURE TRANSMITTER", respectively, should read -- OUTDOOR TEMPERATURE SENSOR -- and -- OUTDOOR TEMPERATURE TRANSMITTER --, respectively.

Signed and sealed this 26th day of May 1964.

(SEAL)
Attest:

ERNEST W. SWIDER                               EDWARD J. BRENNER
Attesting Officer                                    Commissioner of Patents